US011509209B2

(12) United States Patent
De Gasperis

(10) Patent No.: US 11,509,209 B2
(45) Date of Patent: Nov. 22, 2022

(54) GENERATOR USING PERMANENT MAGNETS

(71) Applicant: Giovanni De Gasperis, Toronto (CA)

(72) Inventor: Giovanni De Gasperis, Toronto (CA)

(73) Assignee: Giovanni De Gasperis, Toronto (CA)

( * ) Notice: Subject to any disclaimer, the term of this patent is extended or adjusted under 35 U.S.C. 154(b) by 319 days.

(21) Appl. No.: 16/677,956

(22) Filed: Nov. 8, 2019

(65) Prior Publication Data

US 2021/0143723 A1 May 13, 2021

(51) Int. Cl.
*H02K 21/00* (2006.01)
*H02K 53/00* (2006.01)
*H02K 21/14* (2006.01)

(52) U.S. Cl.
CPC .............. *H02K 53/00* (2013.01); *H02K 21/14* (2013.01)

(58) Field of Classification Search
CPC ................................ H02K 53/00; H02K 21/00
See application file for complete search history.

(56) References Cited

U.S. PATENT DOCUMENTS

| | | | | |
|---|---|---|---|---|
| 1,131,063 A * | 3/1915 | Klemmer | ............. | H02K 7/1853 310/75 B |
| 1,229,308 A * | 6/1917 | Morgan | ................. | H02K 7/116 322/38 |
| 2,535,041 A * | 12/1950 | Clark | ...................... | F21L 13/08 310/75 B |
| 4,196,365 A | 4/1980 | Presley | | |
| 4,751,486 A * | 6/1988 | Minato | .................. | H02K 29/10 310/156.01 |
| 6,930,421 B2 * | 8/2005 | Wise | ...................... | H02K 7/025 310/46 |
| 7,151,332 B2 | 12/2006 | Kundel | | |
| 8,975,766 B2 * | 3/2015 | Inada | ....................... | H01F 7/122 290/1 R |
| 9,413,214 B2 * | 8/2016 | Giummo | ................ | H02K 21/00 |
| 10,326,350 B2 * | 6/2019 | Sadler | .................... | H02K 53/00 |

(Continued)

FOREIGN PATENT DOCUMENTS

| CN | 1066752 A | 12/1992 |
|---|---|---|
| CN | 203130166 U | 8/2013 |

(Continued)

*Primary Examiner* — Dang D Le
(74) *Attorney, Agent, or Firm* — Stratford Group Ltd.

(57) ABSTRACT

A permanent magnet generator consisting of a stator including a pendulating master permanent magnet and a push button. The master permanent magnet is restricted in its oscillation. The master permanent magnet is oriented with a predetermined polarity towards a rotor. The rotor including a plurality of oscillating slave permanent magnets and an axel. The slave permanent magnets are equivalently spaced around an outer edge of said rotor. The slave permanent magnets are restricted in their oscillations and the slave permanent magnets are oriented with the predetermined polarity the outer edge of the rotor. When the push button is engaged, the master permanent magnet and a first of the plurality of the slave permanent magnet's magnetic fields come into contact and repel each other, driving a circular rotation of the rotor. When the circular rotation of the rotor aligns the master permanent magnet and the plurality of the slave permanent magnet's magnetic fields in sequence.

10 Claims, 5 Drawing Sheets

(56) References Cited

U.S. PATENT DOCUMENTS

| | | | |
|---|---|---|---|
| 10,541,597 B2 * | 1/2020 | Whitfield | H02K 49/102 |
| 11,368,079 B2 * | 6/2022 | Deak, Sr. | H02K 1/34 |
| 2003/0234590 A1 * | 12/2003 | Gitzen | H02K 53/00 |
| | | | 310/152 |
| 2005/0023916 A1 * | 2/2005 | Moe | H02K 7/06 |
| | | | 310/103 |
| 2006/0170302 A1 * | 8/2006 | Watson | H02K 53/00 |
| | | | 310/191 |
| 2007/0228856 A1 * | 10/2007 | Bates | H02K 53/00 |
| | | | 310/46 |

FOREIGN PATENT DOCUMENTS

| | | |
|---|---|---|
| DE | 4236125 A1 | 4/1994 |
| WO | 2007/003945 A2 | 1/2007 |

\* cited by examiner

GENERATOR USING PERMANENT MAGNETS

BACKGROUND

Due to the high cost of energy production and high demand of energy consumption internationally, efficient energy conversion methods have been of great interest to the energy conversion industry. Magnetic motors used for energy conversion are commonly employed, frequently using permanent magnets within the system.

U.S. Pat. No. 4,196,365 (Presley) discloses a magnetic motor comprising three equivalently spaced permanent magnets stationed on a rotating disk. The rotating disk is coupled with two adjacently aligned permanent magnets that are stationed on a rocking bracket to repel the rotating disks magnets. Displacement of the bracket magnets is performed by an actuator that is powered from a separate electrical input. This is responsible for the initial and continued force.

U.S. Pat. No. 10,326,350 B2 (Sadler) discloses a magnetic motor comprising one or more magnets stationed on a rotating wheel. The rotating wheel is coupled with a shielded magnet that is stationed on a lever moving back and forth. Displacement of the shielded magnet a pulsed device that is powered from a separate electrical input. This is responsible for the initial and continued force.

However, these systems require some form of electrical power input, which render the device useless in power outages. Additionally, these systems often suffer energy conversion losses in the form of cogging torque, which is derived from opposing magnetic fields approaching one another prior to direct alignment.

There exists a need for a permanent magnet generator system that does not require additional electrical power input and reduces energy conversion losses in the form of cogging torque.

BRIEF SUMMARY

A permanent magnet generator comprising a stator comprising a pendulating master permanent magnet and a push button. The master permanent magnet is restricted in its oscillation. The master permanent magnet is oriented with a predetermined polarity towards a rotor. The rotor comprising a plurality of oscillating slave permanent magnets and an axel. The slave permanent magnets are equivalently spaced around an outer edge of said rotor. The slave permanent magnets are restricted in their oscillations and the slave permanent magnets are oriented with the predetermined polarity towards the outer edge of the rotor. When the push button is engaged, the master permanent magnet and a first of the plurality of the slave permanent magnet's magnetic fields come into contact and repel each other, driving a circular rotation of the rotor. When the circular rotation of the rotor aligns the master permanent magnet and the plurality of the slave permanent magnet's magnetic fields in sequence.

In one embodiment, the restriction in oscillation is achieved using pegs positioned on either side of said master permanent magnet.

In another embodiment, the restriction in oscillation is achieved using springs positioned on either side of said master permanent magnet.

In another embodiment, the restriction in oscillation is achieved using pegs positioned on either side of said slave permanent magnet.

In another embodiment, the restriction in oscillation is achieved using springs positioned on either side of said slave permanent magnet.

In another embodiment, the predetermined polarity is a northern polarity.

In another embodiment, the predetermined polarity is a southern polarity.

In another embodiment, the master permanent magnet is positioned at an angle from a vertical towards the rotor.

In another embodiment, the angle is substantially 45 degrees.

In another embodiment, the axel is attached to a generator.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
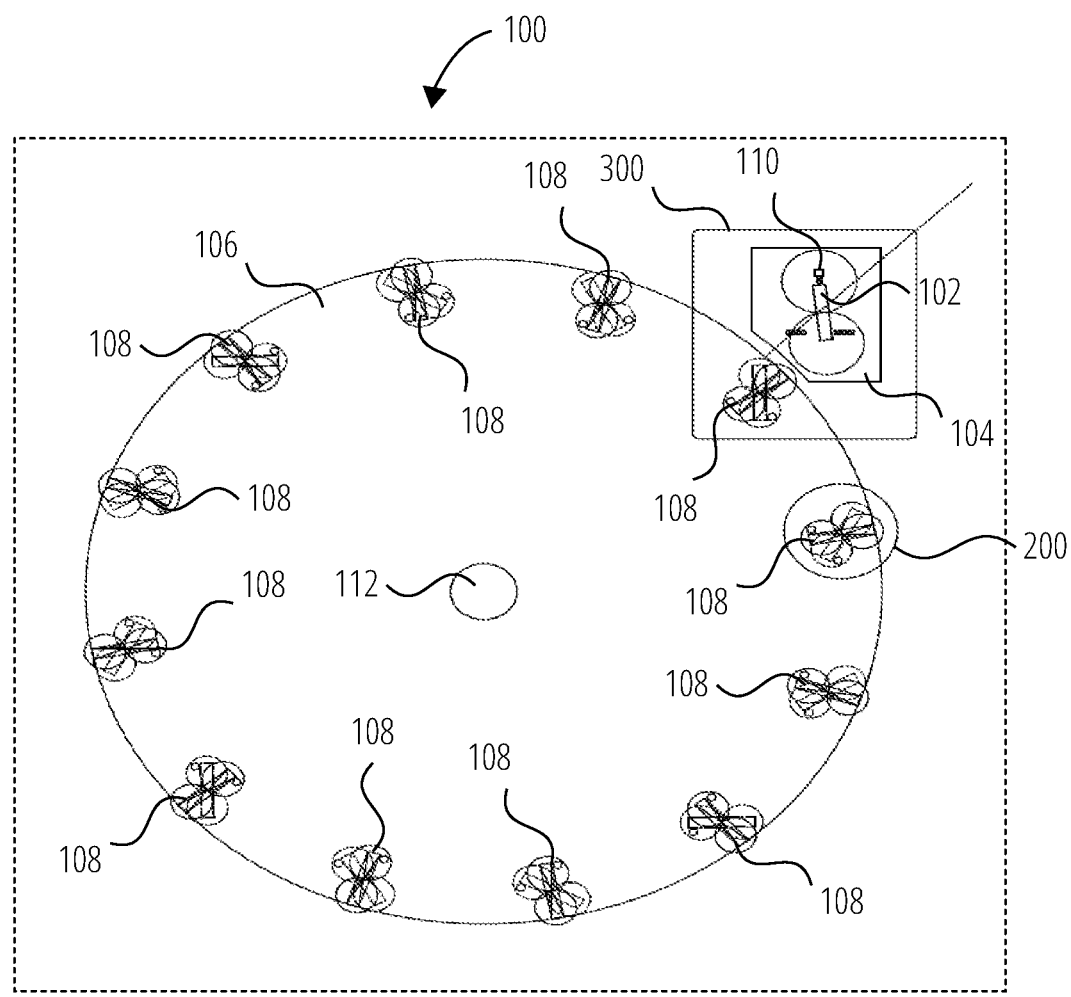
FIG. 1 illustrates a permanent magnet generator front view 100 in accordance with one embodiment.

FIG. 1 depicts a front view of one embodiment of the permanent magnet generator. The master permanent magnet 102 is affixed to the stator 104 at the top portion of the master permanent magnet 102, wherein the bottom half is free to oscillate in a pendular motion within a predetermined range and is positioned at an angle from the vertical towards the rotor 106. The oscillating motion and angled position of the master permanent magnet 102 allow for a reduction in cogging torque between the approaching magnetic fields of the master permanent magnet 102 and a slave permanent magnet 108 during rotor 106 rotation.

A plurality of slave permanent magnets is affixed to a rotor 106 equivalently spaced around the outer edge of the rotor. The slave permanent magnets are attached to the rotor 106 at their center and can oscillate within a predetermined range. The number of slave permanent magnets required to provide substantial motion is determined based on the size of the circumference of the rotor 106, the resistance applied to the axle and the magnetic field strength of the master and slave permanent magnets.

A push button 110 is affixed to the top of the master permanent magnet 102. When the push button 110 is engaged, the stator moves downward, and the magnetic fields of the master permanent magnet 102 and a slave permanent magnet 108 are forced into close proximity and repel one another. The magnetic repulsive force drives the rotor 106 to rotate around an axle 112, where this circular rotation aligns an additional slave permanent magnet 108 with the master permanent magnet 102 providing substantial motion of the rotor 106.

In additional embodiments, the master permanent magnet 102 is positioned at an angle that is substantially 45 degrees from the vertical towards the rotor 106.

Figure 2:
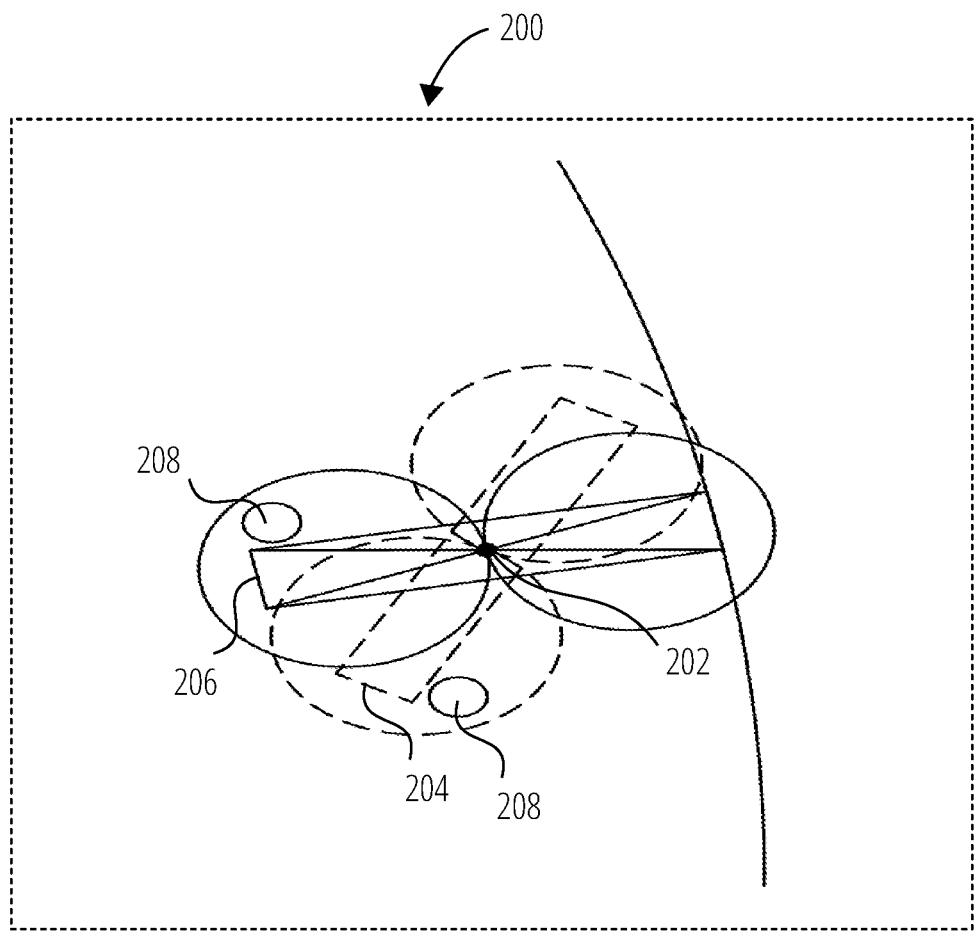
FIG. 2 illustrates a slave permanent magnet oscillation 200 in accordance with one embodiment.

FIG. 2 depicts a slave permanent magnet oscillation 200 of one embodiment of the permanent magnet generator. The slave permanent magnet 108 is affixed to the outer circumference of the rotor 106 via a bored hole 202. The slave permanent magnet 108 is displayed oscillating between a first position 204 and second position 206. A peg 208 is placed on each side of the slave permanent magnet 108 to restrict the amplitude of oscillation.

In additional embodiments, a spring is placed on each side of the slave permanent magnet 108 to restrict the amplitude of oscillation.

Figure 3:
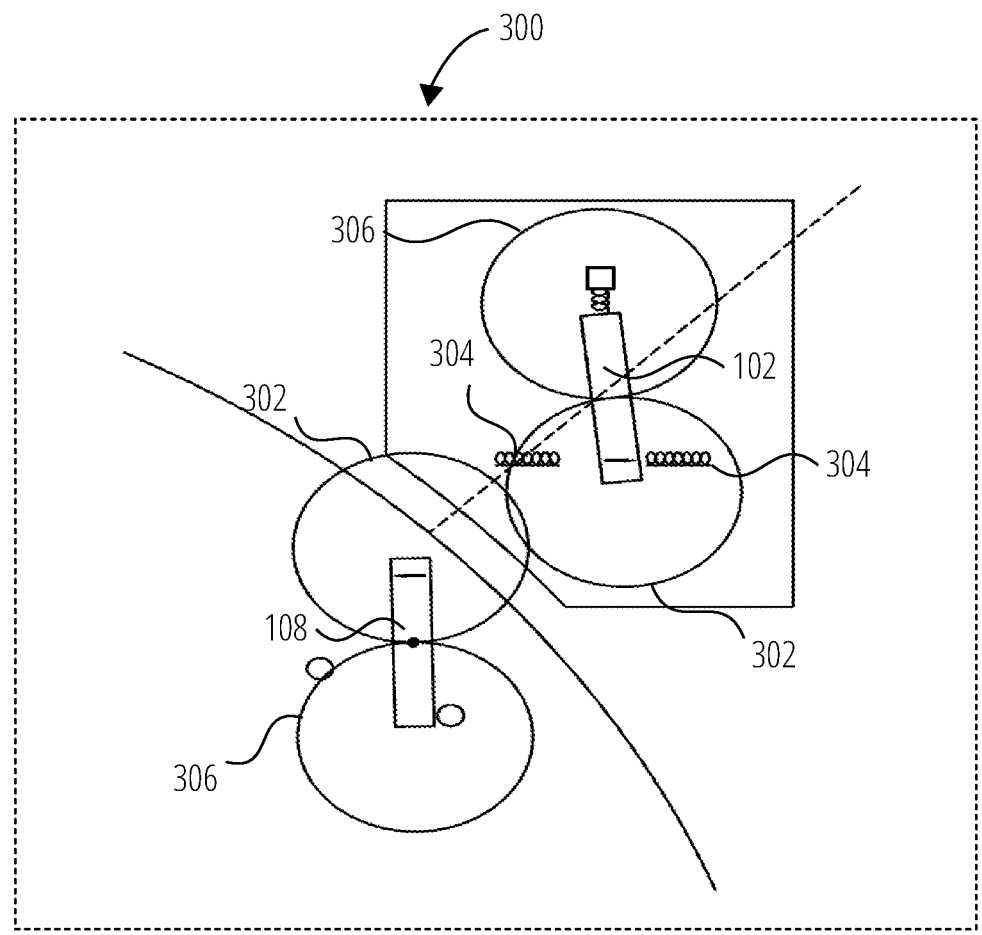
FIG. 3 illustrates an initial magnetic field interaction 300 in accordance with one embodiment.

FIG. 3 depicts an initial magnetic field interaction 300 between the master permanent magnet 102 and a slave permanent magnet 108 of one embodiment of the permanent magnet generator. In this example, a repulsive force is generated from the northern polarity 302 of the slave permanent magnet 108 coming into contact with the northern polarity 302 of the master permanent magnet 102. A spring 304 is placed on each side of the master permanent magnet 102 to restrict the amplitude of oscillation.

In additional embodiments, a peg is placed on each side of the master permanent magnet 102 to restrict the amplitude of oscillation.

In additional embodiments, the aligned magnetic fields of the master permanent magnet 102 and the slave permanent magnet 108 is a southern polarity 306.

Figure 4:
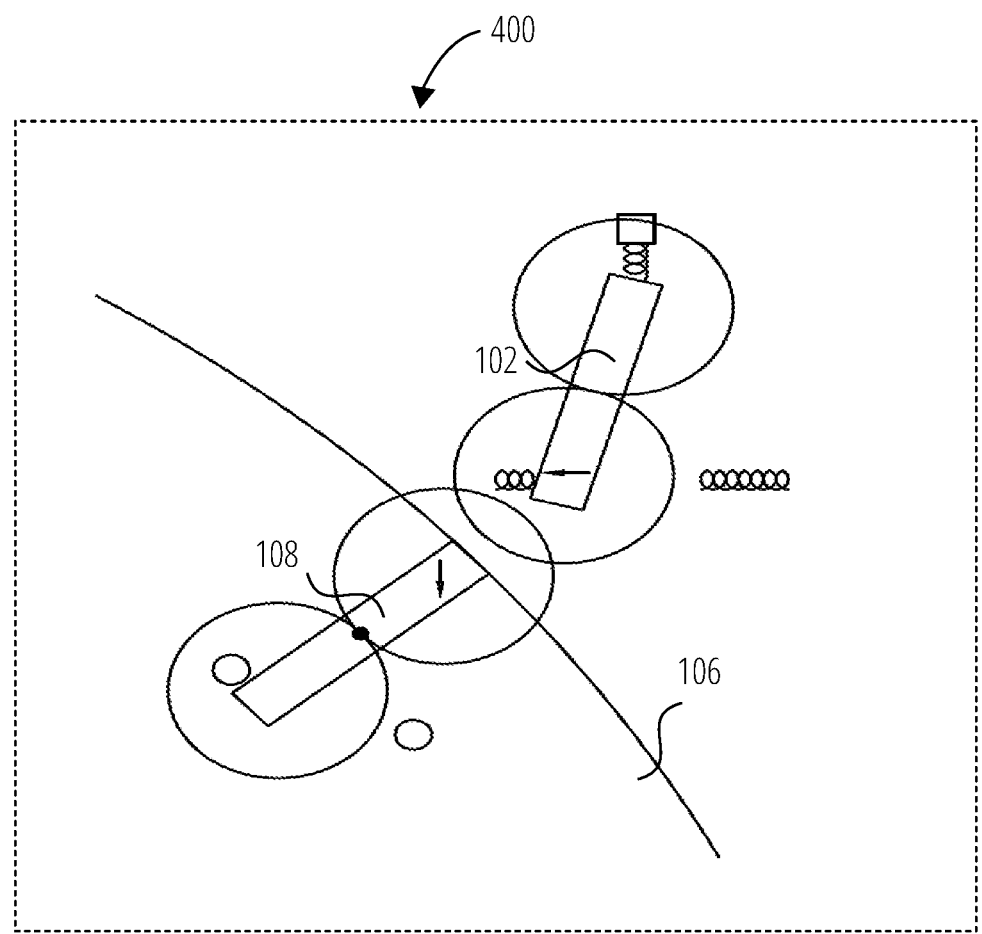
FIG. 4 illustrates a resulting repulsive force 400 in accordance with one embodiment.

FIG. 4 depicts the resulting repulsive force 400 between the master permanent magnet 102 and a slave permanent magnet 108 of one embodiment of the permanent magnet generator. In this example, the resulting repulsive force causes the master permanent magnet 102 and the slave permanent magnet 108 to oscillate, which generates circular rotation of the rotor 106.

Figure 5:
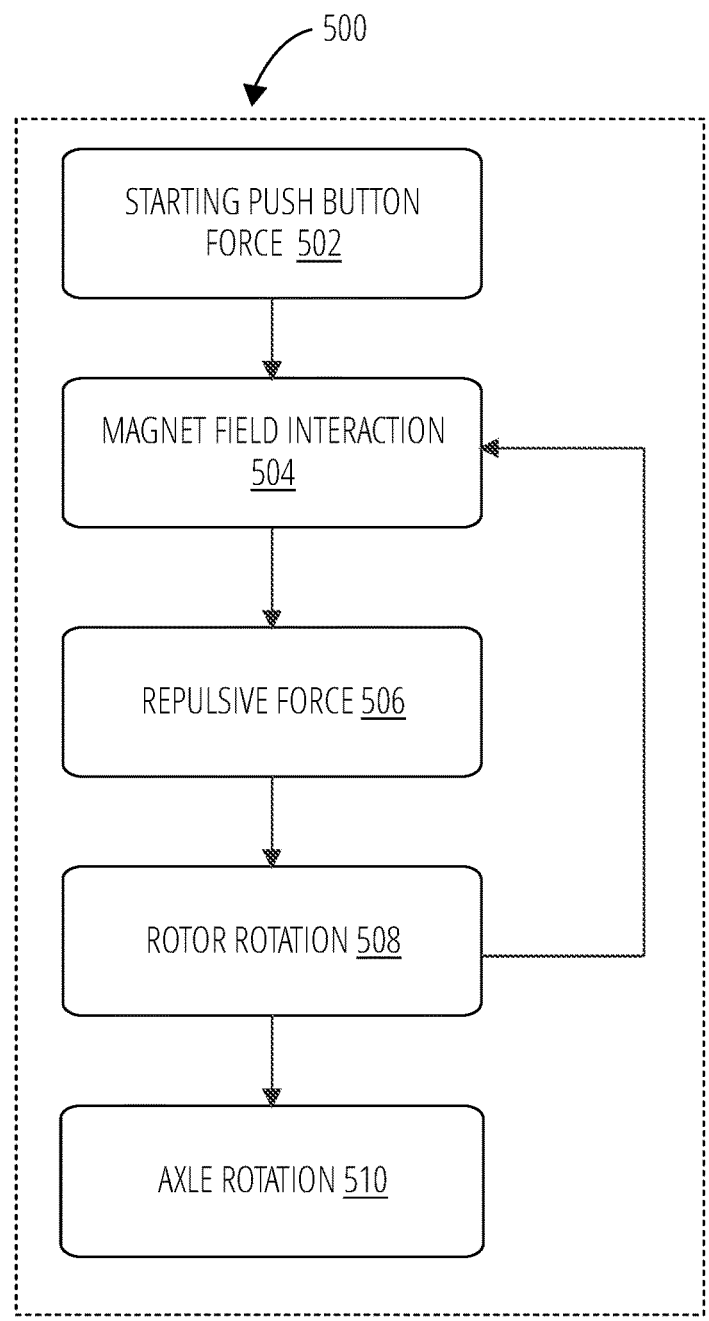
FIG. 5 illustrates a workflow 500 in accordance with one embodiment.

FIG. 5 is a workflow 500 of one embodiment of the permanent magnet generator.

In block 502, a starting push button force 502 engages the master permanent magnet 102 to come into close proximity with a slave permanent magnet 108.

In block 504, the magnet fields of equivalent polarity for the master permanent magnet 102 and a slave permanent magnet 108 are aligned and able to interact.

In block 506, the magnetic fields of equivalent polarity exert a repulsive force on one another.

In block 508, the repulsive force generates a circular rotation of the rotor 106.

In block 510, the circular rotation of the rotor drives a circular rotation of the axle 112.

In additional embodiments, the axle 112 is attached to a generator.

What is claimed is:
1. A permanent magnet generator comprising:
a stator comprising a pendulating master permanent magnet and a push button;
said master permanent magnet is restricted in its oscillation;
said master permanent magnet is oriented with a predetermined polarity towards a rotor;
said rotor comprising a plurality of oscillating slave permanent magnets and an axel;
said slave permanent magnets are equivalently spaced around an outer edge of said rotor;
said slave permanent magnets are restricted in their oscillations;
said slave permanent magnets are oriented with said predetermined polarity towards the outer edge of said rotor;
wherein when said push button is engaged, said master permanent magnet and a first of the plurality of slave permanent magnet's magnetic fields come into contact and repel each other, driving a circular rotation of said rotor;
wherein when said circular rotation of said rotor aligns said master permanent magnet and said plurality of said slave permanent magnet's magnetic fields in sequence.

2. The permanent magnet generator of claim 1 wherein said restricted oscillation is achieved using pegs positioned on either side of said master permanent magnet.

3. The permanent magnet generator of claim 1 wherein said restricted oscillation is achieved using springs positioned on either side of said master permanent magnet.

4. The permanent magnet generator of claim 1 wherein said restricted oscillation is achieved using pegs positioned on either side of said slave permanent magnet.

5. The permanent magnet generator of claim 1 wherein said restricted oscillation is achieved using springs positioned on either side of said slave permanent magnet.

6. The permanent magnet generator of claim 1 wherein said predetermined polarity is a northern polarity.

7. The permanent magnet generator of claim 1 wherein said predetermined polarity is a southern polarity.

8. The permanent magnet generator of claim 1 wherein said master permanent magnet is positioned at an angle from a vertical towards said rotor.

9. The permanent magnet generator of claim 8 wherein said angle is substantially 45 degrees.

10. The permanent magnet generator of claim 1 said axel is attached to a generator.

* * * * *